United States Patent
Yang et al.

(10) Patent No.: US 12,146,845 B2
(45) Date of Patent: Nov. 19, 2024

(54) COMPONENT RESIDUAL STRESS TESTING PLATFORM BASED ON NEUTRON DIFFRACTION AND EXPERIMENTAL METHOD THEREOF

(71) Applicants: NCS TESTING TECHNOLOGY CO., LTD., Beijing (CN); CENTRAL IRON & STEEL RESEARCH INSTITUTE CO., LTD., Beijing (CN)

(72) Inventors: Lixia Yang, Beijing (CN); Haizhou Wang, Beijing (CN); Lizhi Ren, Beijing (CN); Danqi Huang, Beijing (CN); Lei Zhao, Beijing (CN); Xuejing Shen, Beijing (CN); Dongling Li, Beijing (CN); Zongxin Liu, Beijing (CN); Changwang Zhu, Beijing (CN); Yang Wang, Beijing (CN); Yunhai Jia, Beijing (CN)

(73) Assignees: NCS Testing Technology CO., LTD, Beijing (CN); Central Iron & Steel Research Institute Co., Ltd, Beijing (CN)

( * ) Notice: Subject to any disclaimer, the term of this patent is extended or adjusted under 35 U.S.C. 154(b) by 312 days.

(21) Appl. No.: 17/902,952

(22) Filed: Sep. 5, 2022

(65) Prior Publication Data
US 2023/0358693 A1 Nov. 9, 2023

(51) Int. Cl.
*G01N 23/20025* (2018.01)
*G01N 23/207* (2018.01)

(52) U.S. Cl.
CPC ... *G01N 23/20025* (2013.01); *G01N 23/2073* (2013.01); *G01N 2223/056* (2013.01); *G01N 2223/106* (2013.01); *G01N 2223/307* (2013.01); *G01N 2223/607* (2013.01); *G01N 2223/624* (2013.01)

(58) Field of Classification Search
None
See application file for complete search history.

(56) References Cited

U.S. PATENT DOCUMENTS

2023/0358693 A1* 11/2023 Yang .................. G01N 23/2073

FOREIGN PATENT DOCUMENTS

| BR | PI0602688 B1 | * | 3/2021 | |
|---|---|---|---|---|
| CN | 207036549 U | * | 2/2018 | ............ G01N 3/02 |

(Continued)

*Primary Examiner* — Thomas R Artman

(57) ABSTRACT

A component residual stress testing platform based on neutron diffraction and experimental method thereof are provided, the testing platform includes a component support, a rotating mainshaft, a first thrust cylindrical roller bearing, a first cylindrical roller bearing, a bearing spacing sleeve, a second cylindrical roller bearing, a sleeve, and a first fixed baffle. The rotating mainshaft is disposed on the component support. The first thrust cylindrical roller bearing, the first cylindrical roller bearing, the bearing spacing sleeve and the second cylindrical roller bearing are sleeved on the rotating mainshaft, the sleeve is sleeved outside the first cylindrical roller bearing, the bearing spacing sleeve and the second cylindrical roller bearing, a component to be tested is sleeved on the sleeve. The testing platform can support, move, tilt and rotate the component to be tested in a process of a residual stress testing.

9 Claims, 4 Drawing Sheets

(56) References Cited

FOREIGN PATENT DOCUMENTS

| | | | | |
|---|---|---|---|---|
| CN | 113820130 | A | * | 12/2021 |
| CN | 117969563 | A | * | 5/2024 |
| JP | H08233755 | A | * | 9/1996 |

* cited by examiner

COMPONENT RESIDUAL STRESS TESTING PLATFORM BASED ON NEUTRON DIFFRACTION AND EXPERIMENTAL METHOD THEREOF

TECHNICAL FIELD

The disclosure relates to a technical field of residual stress detection, in particular to a component residual stress testing platform based on neutron diffraction and experimental method thereof.

BACKGROUND

Residual stress is a internal stress that exists in an object to keep a balance inside the object without external force. During preparation and forming of a large component, such as solidification, deformation and heat treatment, microstructure evolution and local changes of stress field occur in the large component, resulting in an emergence of multi-scale residual stress field; in a process of machining and assembly, it may cause a redistribution of the multi-scale stress field and deformations; during service, under an action of an external alternating load, a complex stress state superimposed with the multi-scale residual stress field will lead to local damages of the large component, and eventually lead to component failures and catastrophic accidents. It can be seen that the residual stresses run through the whole chain process of preparation, processing, assembly and service of the large component, and its detection and evaluation are very important.

Residual stress detection technology includes destructive detection technology and nondestructive detection technology. Specifically, the destructive detection technology includes drilling method, slicing method, contour method, deep hole method and so on; these technologies usually need to remove part or all of materials of the component and record strain in the surrounding area caused by release of local stress after a removal of the materials, so as to reflect the residual stresses at the position before the release. According to the European Standard BS EN 13262:2020, residual stress detection of the rim of large components of high-speed railway wheels adopts sticking strain gauges and the slicing method, following a procedure to cut the wheel, and obtaining a gradually released stress distribution through the strain gauges. The destructive detection technology needs to break the high-speed railway wheel, therefore, it is difficult to continue to monitor an evolution of residual stresses during service of the component; in addition, the residual stresses obtained by the destructive detection technology are discontinuous, therefore, it is difficult to accurately obtain a three-dimensional stress distribution. The nondestructive detection technology includes ultrasonic method, X-ray diffraction method and neutron diffraction method. The ultrasonic method relies on the difference in the speed of ultrasonic transmission in materials under different stress states to detect the residual stresses. The ultrasonic method can detect stress from millimeter to meter depth, however, what the ultrasonic method obtains is average stress which has a poor spatial resolution, and the ultrasonic method is easy to be disturbed by microstructures of materials. The diffraction method is the most widely used and mature nondestructive detection technology for residual stresses. The principle of the X-ray diffraction method and the neutron diffraction method is the same: strain between atoms being calculated by measuring changes of lattice spacing, and then the stress being calculated from the strain according to Hooke's Law. Due to a limited penetration depth of X-ray to a material, the X-ray diffraction method can only detect residual stresses on the surface of metal materials ranging from ten to hundred microns; however, a neutron beam can penetrate tens of millimeters of steel materials, and can detect deep residual stresses of the large components. By controlling a sampling volume of the neutron beam to millimeter level, deep and three-dimensional residual stress distributions with millimeter-level spatial resolution of the large components can be obtained without damage eventually. Therefore, the development of the residual stress detection technology for the large components based on the neutron diffraction is very important to design, research, development and service safety monitoring of the components.

At present, residual stress detection devices based on the neutron diffraction include neutron diffraction spectrometers of reactor neutron source and spallation neutron source. Residual stress detection of small-size samples and local engineering cutting components has been reported. However, there are often residual stresses in large components such as high-speed railway wheels and aviation turbine disks and the residual stresses inside will be released after cutting, resulting in deviations of testing results. How to install and fix these full-size large components and detect the residual stresses by the neutron diffraction is still difficult, and there is no relevant report. Therefore, it is urgent to develop the component residual stress testing platform based on neutron diffraction and experimental method thereof.

SUMMARY

A purpose of the disclosure is to provide a component residual stress testing platform based on neutron diffraction and experimental method thereof, based on neutron diffraction spectrometers of reactor neutron source and spallation neutron source, a special component detection platform is developed to facilitate the installation and commissioning of components and meet nondestructive detection of deep residual stress distribution of the components.

In order to achieve the above purpose, the disclosure provides following schemes.

A component residual stress testing platform based on neutron diffraction, the testing platform includes: a neutron spectrometer sample table and a component residual stress testing bench disposed on the neutron spectrometer sample table, the component residual stress testing bench includes a component support, a rotating mainshaft, a first thrust cylindrical roller bearing, a first cylindrical roller bearing, a bearing spacing sleeve, a second cylindrical roller bearing, a sleeve, a first fixed baffle, a fixed mainshaft, a second fixed baffle, and a second thrust cylindrical roller bearing. The component support is fixedly disposed on the neutron spectrometer sample table, the rotating mainshaft is disposed on the component support through the fixed mainshaft and the second fixed baffle, the rotating mainshaft and the component support are provided with shaft holes respectively, the rotating mainshaft is connected to the component support by the fixed mainshaft passing through the shaft holes, and the second fixed baffle is disposed at an end of the fixed mainshaft;

the first thrust cylindrical roller bearing, the first cylindrical roller bearing, the bearing spacing sleeve and the second cylindrical roller bearing are successively sleeved on the rotating mainshaft from inside to outside, the bearing spacing sleeve is disposed between the first cylindrical roller bearing and the second cylindrical roller bearing, and the bearing spacing sleeve is configured to adjust a distance between the first cylindrical roller bearing and the second cylindrical roller bearing; the sleeve is sleeved outside the first cylindrical roller bearing, the bearing spacing sleeve, and the second cylindrical roller bearing; the sleeve is configured to be sleeved with a component to be tested, the first fixed baffle is configured for a transverse limit of the component to be tested, a center of the first fixed baffle is embedded with the second thrust cylindrical roller bearing, and the second thrust cylindrical roller bearing is fixedly disposed on the rotating mainshaft through connectors.

In an embodiment, two auxiliary rotating devices are disposed on the neutron spectrometer sample table, the two auxiliary rotating devices are a first auxiliary rotating device and a second auxiliary rotating device respectively, the first auxiliary rotating device and the second auxiliary rotating device are symmetrically disposed at two sides of the rotating mainshaft and are located below the component to be tested.

In an embodiment, structures of the first auxiliary rotating device and the second auxiliary rotating device are the same, each of the structures includes a base gasket and an auxiliary bearing disposed on the base gasket, the auxiliary bearing is rotatably disposed on the base gasket, and rotation directions of the auxiliary bearings are opposite to a rotation direction of the component to be tested, the first auxiliary rotating device and the second auxiliary rotating device are configured to assist in supporting and rotating the component to be tested.

In an embodiment, the connectors include a screw and a screw ferrule, the screw passes through a center of the second thrust cylindrical roller bearing to be fixed at a center of the rotating mainshaft, and the screw ferrule is disposed between a nut of the screw and the second thrust cylindrical roller bearing.

In an embodiment, a thickness of the sleeve is in a range of 5 mm to 50 mm.

In an embodiment, the rotating mainshaft is rotatable around the fixed mainshaft, and an included angle between a horizontal plane of the neutron spectrometer sample table and the rotating mainshaft is in a range of 0° to 90°.

In an embodiment, the component residual stress testing platform further includes a support mounting base, which is fixedly disposed between the neutron spectrometer sample table and the component support. The disclosure further provides an experimental method of the component residual stress testing platform based on neutron diffraction, the method is applied in the component residual stress testing platform based on neutron diffraction, including following steps:

S1, preparing an unstressed sample;
S2, determining neutron diffraction measurement parameters and measuring the unstressed sample;
S3, fixing the component to be tested on the residual stress testing bench and installing the component to be tested on the neutron spectrometer sample table;
S4, setting a testing path of the component to be tested and measuring the component to be tested by the neutron diffraction spectrometer;
S5, deriving an elastic strain and calculating residual stresses according to changes of lattice spacing between the component to be tested and the unstressed sample.

In an embodiment, the step S3, fixing the component to be tested on the testing bench and installing the component to be tested on the neutron spectrometer sample table, specifically including:

selecting the sleeve with a target thickness according to an inner diameter of the component to be tested, and putting the component to be tested on the sleeve; and then, through the first fixed baffle and the second thrust cylindrical roller bearing, the component to be tested being transversely limited on the rotating mainshaft to ensure that the component to be tested can rotate freely around the rotating mainshaft while being fixed transversely.

According to the specific embodiments provided by the disclosure, the disclosure provides following technical effects. The disclosure provides a component residual stress testing platform based on neutron diffraction and experimental method thereof, a component residual stress testing bench disposed on the neutron spectrometer sample table, the component residual stress testing bench includes a component support, a rotating mainshaft, a first thrust cylindrical roller bearing, a first cylindrical roller bearing, a bearing spacing sleeve, a second cylindrical roller bearing, a sleeve, and a first fixed baffle, a fixed mainshaft, a second fixed baffle, and a second thrust cylindrical roller bearing. The disclosure can support, move, tilt and rotate the component to be tested in a process of a residual stress testing, with simple structure and convenient installation and operation. By selecting sleeves of different thickness, components with different inner diameters can be installed to realize the measurement of the components with multiple sizes in the same device, which is conducive to the development of residual stress testing methods for the components and meet nondestructive detection of deep residual stress distribution of the components.

BRIEF DESCRIPTION OF DRAWINGS

In order to more clearly explain the embodiments of the disclosure or the technical schemes in the prior art, the following will briefly introduce drawings that need to be used in the embodiments. It is obvious that the drawings in the following description are only some embodiments of the disclosure. For those skilled in the art, other drawings can be obtained from these drawings without giving creative work.

DESCRIPTION OF REFERENCE NUMERALS

Figure 1:
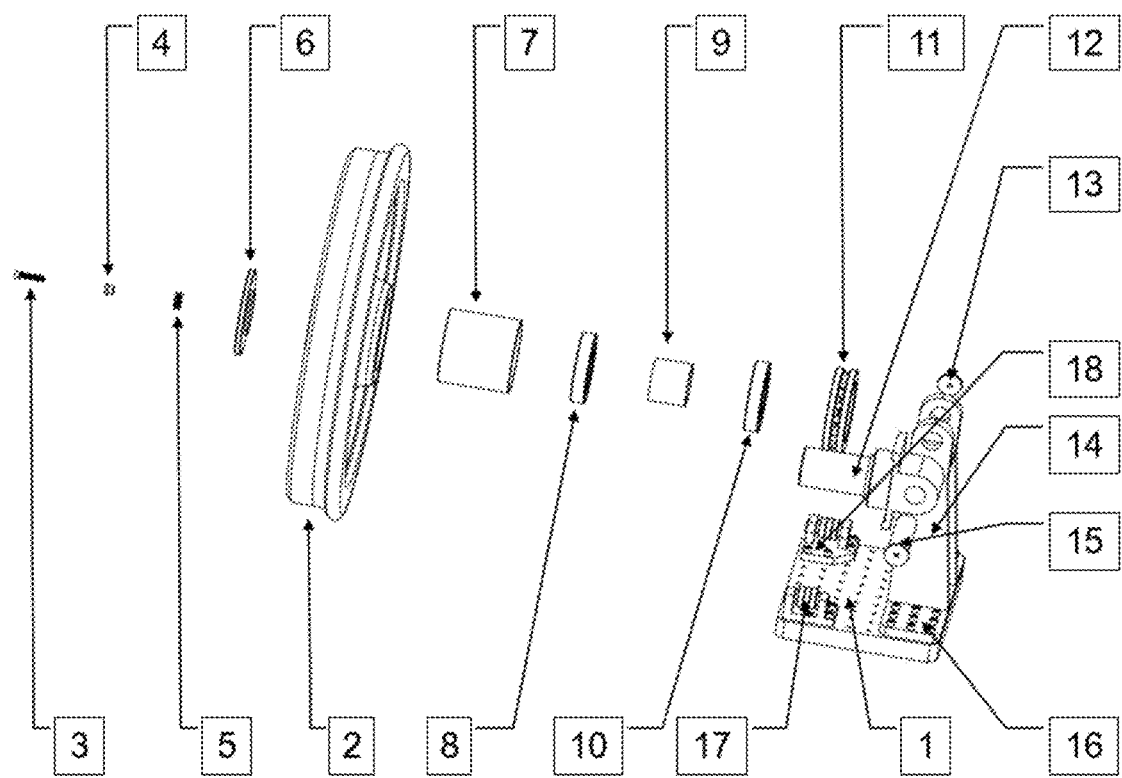
FIG. 1 is an exploded drawing of a component residual stress testing platform based on neutron diffraction of the disclosure.
Figure 2:
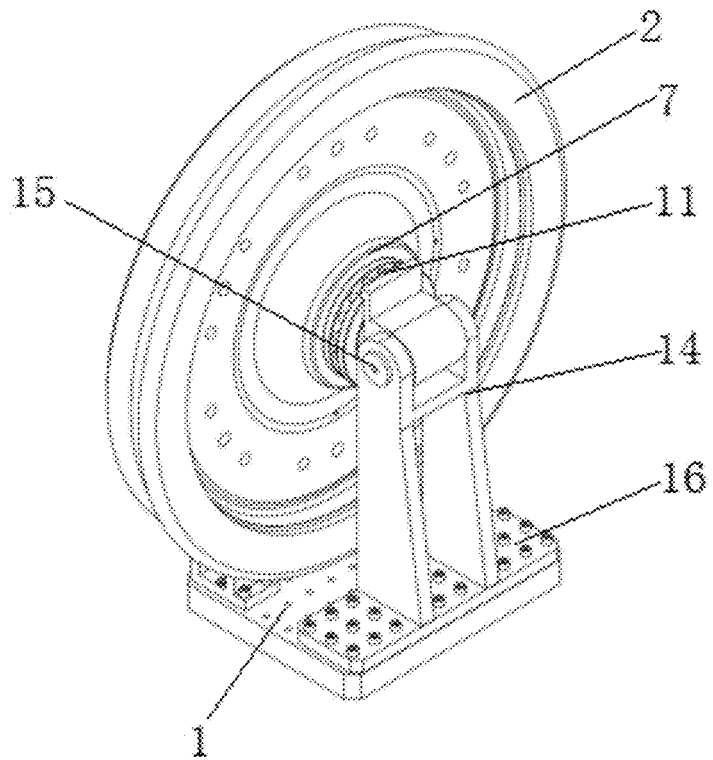
FIG. 2 is an axonometric view I of the component residual stress testing platform based on neutron diffraction of the disclosure.
Figure 3:
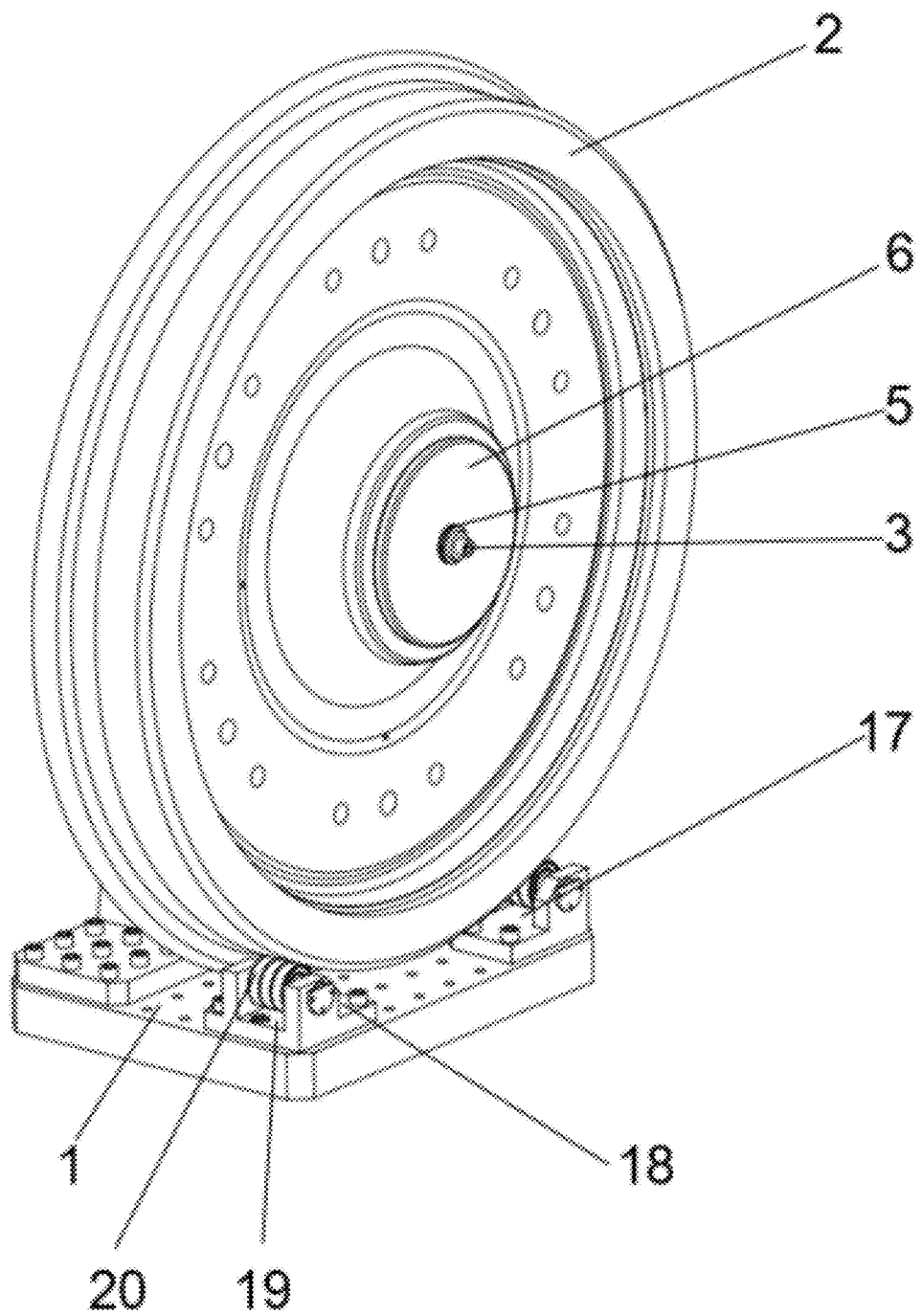
FIG. 3 is an axonometric view II of the component residual stress testing platform based on neutron diffraction of the disclosure.
Figure 4:
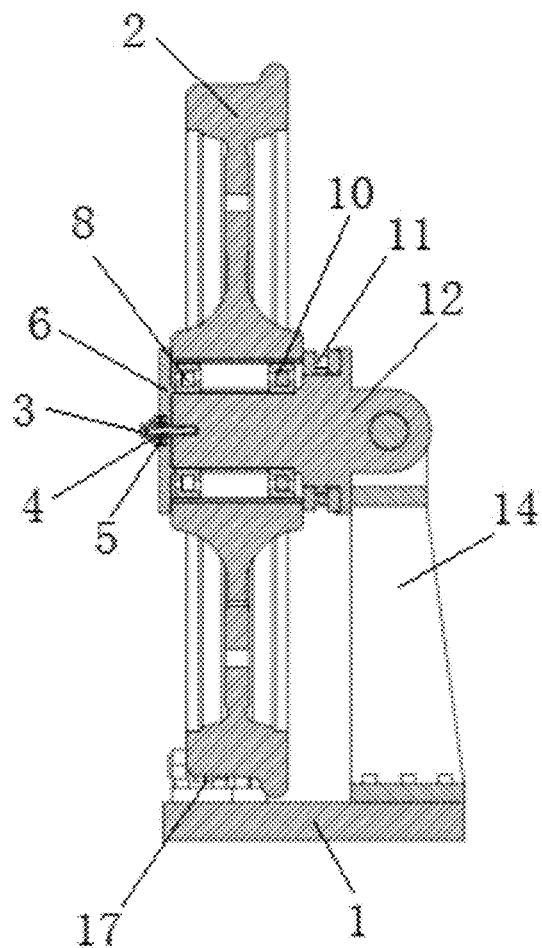
FIG. 4 is a sectional view of the component residual stress testing platform based on neutron diffraction of the disclosure.
Figure 5:
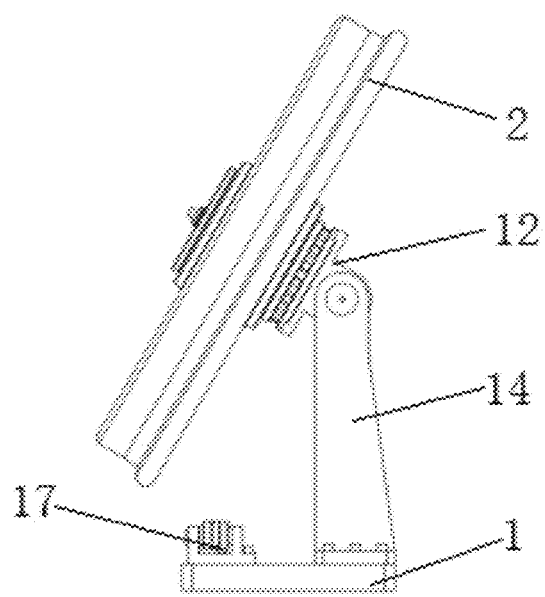
FIG. 5 is a right view of the component residual stress testing platform based on neutron diffraction of the disclosure.
Figure 6:
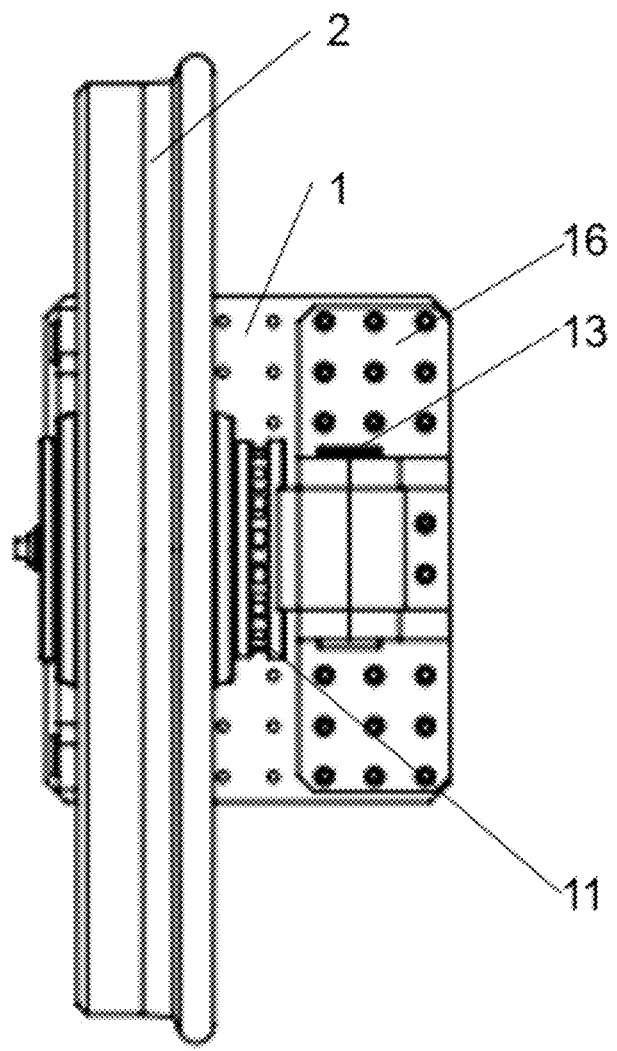
FIG. 6 is a top view of the component residual stress testing platform based on neutron diffraction of the disclosure.

1—neutron spectrometer sample table; 2—component to be tested; 3—screw; 4—screw ferrule; 5—second thrust cylindrical roller bearing; 6—first fixed baffle; 7—sleeve;

8—second cylindrical roller bearing; 9—bearing spacing sleeve; 10—first cylindrical roller bearing; 11—first thrust cylindrical roller bearing; 12—rotating mainshaft; 13—second fixed baffle; 14—component support; 15—fixed mainshaft; 16—support mounting base; 17—first auxiliary rotating device; 18—second auxiliary rotating device; 19—base gasket; 20—auxiliary bearing.

DETAILED DESCRIPTION OF EMBODIMENTS

The technical schemes in the embodiments of the disclosure will be clearly and completely described below in combination with the drawings in the embodiments of the disclosure. Obviously, the described embodiments are some of the embodiments of the disclosure, not all of the embodiments. Based on the embodiments of the disclosure, all other embodiments obtained by those skilled in the art without giving creative work should be within the scope of the disclosure.

A purpose of the disclosure is to provide a component residual stress testing platform based on neutron diffraction and experimental method thereof, based on neutron diffraction spectrometers of reactor neutron source and spallation neutron source, a special component detection platform is developed to facilitate the installation and commissioning of components and meet nondestructive detection of deep residual stress distribution of the components.

In order to make the above purpose, characteristics and advantages of the disclosure more obvious and easy to understand, the disclosure is further described in detail below in combination with the drawings and specific embodiments.

As shown in FIG. 1 to FIG. 6, the disclosure provides a component residual stress testing platform based on neutron diffraction, the residual stress testing platform includes: a neutron spectrometer sample table 1 and a component residual stress testing bench disposed on the neutron spectrometer sample table 1, the component residual stress testing bench includes a component support 14, a rotating mainshaft 12, a first thrust cylindrical roller bearing 11, a first cylindrical roller bearing 10, a bearing spacing sleeve 9, a second cylindrical roller bearing 8, a sleeve 7, a first fixed baffle 6, a fixed mainshaft 15, a second fixed baffle 13, and a second thrust cylindrical roller bearing 5. The component support 14 is fixedly disposed on the neutron spectrometer sample table 1, the rotating mainshaft 12 is disposed on the component support 14 through the fixed mainshaft 15 and the second fixed baffle 13, the rotating mainshaft 12 and the component support 14 are provided with shaft holes respectively, the rotating mainshaft 12 is connected to the component support 14 by the fixed mainshaft 15 passing through the shaft holes, and the second fixed baffle 13 is disposed at an end of the fixed mainshaft 15.

The first thrust cylindrical roller bearing 11, the first cylindrical roller bearing 10, the bearing spacing sleeve 9 and the second cylindrical roller bearing 8 are successively sleeved on the rotating mainshaft 12 from inside to outside, the bearing spacing sleeve 9 is disposed between the first cylindrical roller bearing 10 and the second cylindrical roller bearing 8, and the bearing spacing sleeve 9 is configured to adjust a distance between the first cylindrical roller bearing 10 and the second cylindrical roller bearing 8; the sleeve 7 is sleeved outside the first cylindrical roller bearing 10, the bearing spacing sleeve 9 and the second cylindrical roller bearing 8; the sleeve 7 is configured to be sleeved with a component to be tested 2, the first fixed baffle 6 is configured for a transverse limit of the component to be tested 2, a center of the first fixed baffle 6 is embedded with the second thrust cylindrical roller bearing 5, and the second thrust cylindrical roller bearing 5 is fixedly disposed on the rotating mainshaft 12 through connectors.

Two auxiliary rotating devices are disposed on the neutron spectrometer sample table 1, the two auxiliary rotating devices are a first auxiliary rotating device 17 and a second auxiliary rotating device 18 respectively, the first auxiliary rotating device 17 and the second auxiliary rotating device 18 are symmetrically disposed at two sides of the rotating mainshaft 12 and are located directly below the component to be tested 2. Structures of the first auxiliary rotating device 17 and the second auxiliary rotating device 18 are the same, each of the structures includes a base gasket 19 and an auxiliary bearing 20 disposed on the base gasket 19, the auxiliary bearing 20 is rotatably disposed on the base gasket 19, and rotation directions of the auxiliary bearings 20 are opposite to a rotation direction of the component to be tested 2, the first auxiliary rotating device 17 and the second auxiliary rotating device 18 are configured to assist in supporting and rotating the component to be tested 2. A bottom of the component to be tested 2 presses on the two auxiliary rotating devices so that the whole weight of the testing platform and the component to be tested 2 presses on the neutron spectrometer sample table 1 through three sides, so that applied force on the neutron spectrometer sample table 1 is relatively uniform, so as to prevent the neutron spectrometer sample table 1 from deforming due to torque force.

The connectors include a screw 3 and a screw ferrule 4, the screw 3 passes through a center of the second thrust cylindrical roller bearing 5 to be fixed at a center of the rotating mainshaft 12, and the screw ferrule 4 is disposed between a nut of the screw 3 and the second thrust cylindrical roller bearing 5. The second thrust cylindrical roller bearing 5 and the first fixed baffle 6 ensure that the component to be tested 2 can rotate freely around the mainshaft 12 while being fixed transversely.

A thickness of the sleeve 7 is in a range of 5 mm to 50 mm, components with different inner diameters can be installed to realize the measurement of the components with multiple sizes in the same testing bench.

The rotating mainshaft 12 is rotatable around the fixed mainshaft 15, and an included angle between a horizontal plane of the neutron spectrometer sample table 1 and the rotating mainshaft 12 is in a range of 0° to 90°.

The residual stress testing platform further includes a support mounting base 16, which is fixedly disposed between the neutron spectrometer sample table 1 and the component support 14.

In a specific implementation process, the neutron spectrometer sample table 1 is automatically controlled by a stepping motor and software to realize up and down, left and right movements and rotations. Through installing the testing bench on the neutron spectrometer sample table 1, the disclosure can support, move, tilt and rotate the component to be tested 2 in a process of a residual stress testing, and meet the residual stress test in different directions. Through installing the component support 14 on the neutron spectrometer sample table 1, the component to be tested 2 can be fixed and supported, and can realize up, down, left, and right movement and rotation with the neutron spectrometer sample table 1; through fixing the rotating mainshaft 12 on the component support 14 in different directions, the component to be tested 2 can realize a tilted rotation; through the first cylindrical roller bearing 11 and a combined rolling kit, the component to be tested 2 can be fixed and rotated; and through the first auxiliary rotating device 17 and the second auxiliary rotating device 18, the component to be tested 2 can be supported and rotated.

According to an inner diameter of the component to be tested 2, the embodiment adopts a sleeve 7 with a thickness of 5 mm. The included angle between the horizontal plane of the neutron spectrometer sample table 1 and the rotating mainshaft 12 is set to 0° according to a testing position of the component to be tested 2, which makes the component to be tested 2 to be placed perpendicularly to the neutron spectrometer sample table 1 along a radial direction.

The disclosure further provides an experimental method of the component residual stress testing platform based on neutron diffraction, the method is applied in the component residual stress testing platform based on neutron diffraction, including following steps:

S1, preparing an unstressed sample;

S2, determining neutron diffraction measurement parameters and measuring the unstressed sample;

S3, fixing the component to be tested on the residual stress testing bench and installing the component to be tested on the neutron spectrometer sample table, specifically including:

selecting the sleeve with a target thickness according to an inner diameter of the component to be tested, and putting the component to be tested on the sleeve;

then, through the first fixed baffle and the second thrust cylindrical roller bearing, the component to be tested being transversely limited on the rotating mainshaft to ensure that the component to be tested can rotate freely around the rotating mainshaft while being fixed transversely;

S4, setting a testing path of the component to be tested and measuring the component to be tested by the neutron diffraction spectrometer; and S5, deriving an elastic strain and calculating residual stresses according to changes of lattice spacing between the component to be tested and the unstressed sample.

Figure 7:
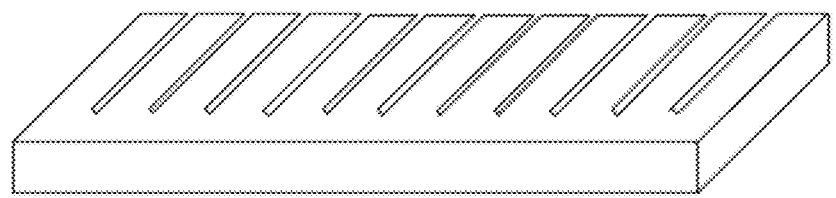
FIG. 7 is a schematic diagram of an unstressed sample of the disclosure.

Among them, the unstressed sample prepared in step S1 is obtained from the same testing position of the same batch of components to be tested by wire cutting, a thickness of the unstressed sample is in a range of 5 mm to 10 mm, and the unstressed sample is processed into a shape of comb with equal spacing by the wire cutting. As shown in FIG. 7, spacing of the comb shaped unstressed sample with the equal spacing may be in a range of 2 mm to 15 mm. In the specific embodiment, the thickness of the unstressed sample is 5 mm, and the unstressed sample is processed into the shape of the comb with the equal spacing of 5 mm by the wire cutting.

The neutron diffraction measurement parameters of the step S2 include diffraction peak (spectrum), sampling volume, testing direction and measurement time of samples to be tested; the samples to be tested include the unstressed sample and the component to be tested, these parameters of the unstressed sample and the component to be tested are consistent.

In the step S2, when the neutron diffraction spectrometer of reactor neutron source is adopted, a measurement result of the diffraction peak (spectrum) is characteristic crystal plane diffraction peak; when the neutron diffraction spectrometer of spallation neutron source is adopted, a measurement result of the diffraction peak (spectrum) is diffraction spectrum; the sampling volume is determined by an incident slit and an exit slit of the neutron spectrometer, a range of the sampling volume is 1×1×1 mm³ to 10×10×10 mm³, such as the sampling volume is 3×3×3 mm³; the testing direction includes circumferential, radial and axial directions, the circumferential direction is a direction that the component to be tested rotates, the radial direction is a direction along a radius of the component to be tested, the axial direction is a direction parallel to the thickness of the component to be tested; the measurement time is determined by a size of the samples to be tested, diffraction intensity and background intensity, a range of the measurement time is tens to thousands of seconds, such the range may be 50 seconds to 3000 seconds.

In the step S4, setting the testing path of the component to be tested is a distribution test in different positions, depths and directions.

In the step S5, a calculation formula of the elastic strain is:

$$\varepsilon_{hkl} = \frac{d_{hkl} - d_{0,hkl}}{d_{0,hkl}} = \frac{\Delta d_{hkl}}{d_{0,hkl}} = \frac{\sin\theta_{0,hkl}}{\sin\theta_{hkl}} - 1$$

Where, hkl is Miller indices, $\varepsilon_{hkl}$ is the elastic strain related to Miller indices, $d_{0,hkl}$ is lattice spacing of the unstressed sample related to Miller indices, $d_{hkl}$ is lattice spacing of the component to be tested related to Miller indices, $\theta_{0,hkl}$ is a Bragg angle of the unstressed sample related to Miller indices, $\theta_{hkl}$ is a Bragg angle of the component to be tested related to Miller indices.

In the step S5, calculation formulas of the residual stresses are:

$$\sigma_{xx} = \frac{E_{hkl}}{(1 + v_{hkl})(1 - 2v_{hkl})}[(1 - v_{hkl})\varepsilon_{xx} + v_{hkl}(\varepsilon_{yy} + \varepsilon_{zz})]$$

$$\sigma_{yy} = \frac{E_{hkl}}{(1 + v_{hkl})(1 - 2v_{hkl})}[(1 - v_{hkl})\varepsilon_{yy} + v_{hkl}(\varepsilon_{xx} + \varepsilon_{zz})]$$

$$\sigma_{zz} = \frac{E_{hkl}}{(1 + v_{hkl})(1 - 2v_{hkl})}[(1 - v_{hkl})\varepsilon_{zz} + v_{hkl}(\varepsilon_{xx} + \varepsilon_{yy})]$$

Where, $\sigma_{xx}$, $\sigma_{yy}$, and $\sigma_{zz}$ are residual stresses in three orthogonal directions; $\varepsilon_{xx}$, $\varepsilon_{yy}$, $\varepsilon_{zz}$ are elastic strains in three orthogonal directions, $E_{hkl}$ is elastic modulus related to Miller indices; $v_{hkl}$ is Poisson's ratio related to Miller indices.

In the specific embodiment, the component to be tested may be a high-speed railway wheel, an aviation turbine disk or others.

The disclosure provides a component residual stress testing platform based on neutron diffraction and experimental method thereof, a component residual stress testing bench disposed on the neutron spectrometer sample table, the component residual stress testing bench includes a component support, a rotating mainshaft, a first thrust cylindrical roller bearing, a first cylindrical roller bearing, a bearing spacing sleeve, a second cylindrical roller bearing, a sleeve, a first fixed baffle, a fixed mainshaft, a second fixed baffle, and a second thrust cylindrical roller bearing. The disclosure can support, move, tilt and rotate the component to be tested in a process of a residual stress testing, with simple structure and convenient installation and operation. By selecting sleeves of different thickness, components to be tested with different inner diameters can be installed to realize the measurement of the components to be tested with multiple sizes in the same device, which is conducive to the development of residual stress testing methods for the components and meets nondestructive detection of deep residual stress distribution of the components. The testing platform and experimental method provided by the disclosure can support, move, tilt and rotate the component to be tested in a process of a residual stress testing; the disclosure can also obtain three-dimensional and deep residual stress distributions with millimeter-level spatial resolution, and overcome limitations of traditional detection technology, such as destruction, limited penetration and low spatial resolution.

In the specification, specific embodiments are used to explain the principle and implementation mode of the disclosure. The description of the above embodiments is only used to understand the method and main idea of the disclosure. At the same time, for those skilled in the art, there will be changes in the specific implementation mode and application scope according to the idea of the disclosure. To sum up, the contents of the specification should not be understood as limitations of the disclosure.

What is claimed is:

1. A component residual stress testing platform based on neutron diffraction, comprising a neutron spectrometer sample table and a component residual stress testing bench disposed on the neutron spectrometer sample table, wherein the component residual stress testing bench comprises:
   a component support;
   a rotating mainshaft;
   a first thrust cylindrical roller bearing;
   a first cylindrical roller bearing;
   a bearing spacing sleeve;
   a second cylindrical roller bearing;
   a sleeve;
   a first fixed baffle;
   a fixed mainshaft;
   a second fixed baffle; and
   a second thrust cylindrical roller bearing;
   wherein the component support is fixedly disposed on the neutron spectrometer sample table, the rotating mainshaft is disposed on the component support through the fixed mainshaft and the second fixed baffle, the rotating mainshaft and the component support are provided with shaft holes respectively, the rotating mainshaft is connected to the component support by the fixed mainshaft passing through the shaft holes, and the second fixed baffle is disposed at an end of the fixed mainshaft;
   wherein the first thrust cylindrical roller bearing, the first cylindrical roller bearing, the bearing spacing sleeve and the second cylindrical roller bearing are successively sleeved on the rotating mainshaft from inside to outside, the bearing spacing sleeve is disposed between the first cylindrical roller bearing and the second cylindrical roller bearing, and the bearing spacing sleeve is configured to adjust a distance between the first cylindrical roller bearing and the second cylindrical roller bearing; the sleeve is sleeved outside the first cylindrical roller bearing, the bearing spacing sleeve, and the second cylindrical roller bearing; the sleeve is configured to be sleeved with a component to be tested, the first fixed baffle is configured for a transverse limit of the component to be tested, a center of the first fixed baffle is embedded with the second thrust cylindrical roller bearing, and the second thrust cylindrical roller bearing is fixedly disposed on the rotating mainshaft through connectors.

2. The component residual stress testing platform based on neutron diffraction according to claim 1, wherein two auxiliary rotating devices are disposed on the neutron spectrometer sample table, the two auxiliary rotating devices are a first auxiliary rotating device and a second auxiliary rotating device respectively, the first auxiliary rotating device and the second auxiliary rotating device are symmetrically disposed at two sides of the rotating mainshaft and are located below the component to be tested.

3. The component residual stress testing platform based on neutron diffraction according to claim 2, wherein structures of the first auxiliary rotating device and the second auxiliary rotating device are the same, each of the structures comprises a base gasket and an auxiliary bearing disposed on the base gasket, the auxiliary bearing is rotatably disposed on the base gasket, and rotation directions of the auxiliary bearings are opposite to a rotation direction of the component to be tested, the first auxiliary rotating device and the second auxiliary rotating device are configured to assist in supporting and rotating the component to be tested.

4. The component residual stress testing platform based on neutron diffraction according to claim 1, wherein the connectors comprise a screw and a screw ferrule, the screw passes through a center of the second thrust cylindrical roller bearing to be fixed at a center of the rotating mainshaft, and the screw ferrule is disposed between a nut of the screw and the second thrust cylindrical roller bearing.

5. The component residual stress testing platform based on neutron diffraction according to claim 1, wherein a thickness of the sleeve is in a range of 5 mm to 50 mm.

6. The component residual stress testing platform based on neutron diffraction according to claim 1, wherein the rotating mainshaft is rotatable around the fixed mainshaft, and an included angle between a horizontal plane of the neutron spectrometer sample table and the rotating mainshaft is in a range of 0° to 90°.

7. The component residual stress testing platform based on neutron diffraction according to claim 1, wherein the component residual stress testing platform further comprises a support mounting base fixedly disposed between the neutron spectrometer sample table and the component support.

8. An experimental method of the component residual stress testing platform based on neutron diffraction, wherein the method is applied in the component residual stress testing platform based on neutron diffraction according to claim 1, and the method comprises:
   preparing an unstressed sample;
   determining neutron diffraction measurement parameters and measuring the unstressed sample;
   fixing the component to be tested on the residual stress testing bench and installing the component to be tested on the neutron spectrometer sample table;
   setting a testing path of the component to be tested and measuring the component to be tested by the neutron diffraction; and
   deriving an elastic strain and calculating residual stresses according to changes of lattice spacing between the component to be tested and the unstressed sample.

9. The experimental method of the component residual stress testing platform based on neutron diffraction according to claim 8, wherein the fixing the component to be tested on the testing bench and installing the component to be tested on the neutron spectrometer sample table, comprises:
   selecting the sleeve with a target thickness according to an inner diameter of the component to be tested, and putting the component to be tested on the sleeve; and
   limiting the component to be tested to the rotating mainshaft transversely through the first fixed baffle and the second thrust cylindrical roller bearing, to make the component to be tested be rotatable around the rotating mainshaft while being fixed transversely.

\* \* \* \* \*